(12) United States Patent
Tanaka et al.

(10) Patent No.: US 11,835,643 B2
(45) Date of Patent: Dec. 5, 2023

(54) WORK MACHINE CONTROL SYSTEM, WORK MACHINE, AND WORK MACHINE CONTROL METHOD

(71) Applicant: Komatsu Ltd., Tokyo (JP)

(72) Inventors: Daisuke Tanaka, Tokyo (JP); Tatsuya Shiga, Tokyo (JP)

(73) Assignee: Komatsu Ltd., Tokyo (JP)

( * ) Notice: Subject to any disclaimer, the term of this patent is extended or adjusted under 35 U.S.C. 154(b) by 694 days.

(21) Appl. No.: 16/982,775

(22) PCT Filed: Feb. 27, 2019

(86) PCT No.: PCT/JP2019/007691
§ 371 (c)(1),
(2) Date: Sep. 21, 2020

(87) PCT Pub. No.: WO2020/026490
PCT Pub. Date: Feb. 6, 2020

(65) Prior Publication Data
US 2021/0011122 A1    Jan. 14, 2021

(30) Foreign Application Priority Data
Jul. 31, 2018 (JP) ................................. 2018-144523

(51) Int. Cl.
*G01S 7/40* (2006.01)
*G01S 13/86* (2006.01)
(Continued)

(52) U.S. Cl.
CPC ............... *G01S 7/40* (2013.01); *G01S 13/86* (2013.01); *G01S 13/931* (2013.01); *G01S 19/46* (2013.01); *G01S 2013/932* (2020.01)

(58) Field of Classification Search
CPC .......... G01S 7/40; G01S 13/86; G01S 13/931; G01S 19/46; G01S 2013/932;
(Continued)

(56) References Cited

U.S. PATENT DOCUMENTS 10,488,867 B2    11/2019  Tojima et al.
2002/0135468 A1*  9/2002  Bos ........................... B60R 1/12
                                                          340/436
(Continued)

FOREIGN PATENT DOCUMENTS

JP    2009-264983 A    11/2009
JP    2014-48205 A     3/2014
(Continued)

OTHER PUBLICATIONS

International Search Report dated May 21, 2019, issued for PCT/JP2019/007691.
(Continued)

*Primary Examiner* — Behrang Badii
(74) *Attorney, Agent, or Firm* — Locke Lord LLP

(57) ABSTRACT

A work machine control method includes: acquiring a detection position of a landmark detected by a non-contact sensor provided in a work machine in traveling of the work machine traveling on a traveling path; calculating a first relative distance between the non-contact sensor and the landmark on a basis of the detection position of the landmark; calculating a second relative distance between the non-contact sensor and the landmark on a basis of a registration position of the landmark; calculating a correction value relating to a relative distance between the non-contact sensor and the landmark on a basis of the first relative distance and the second relative distance; correcting the first relative distance on a basis of the correction value to calculate a corrected relative distance between the non-
(Continued)

contact sensor and the landmark; and controlling a traveling state of the work machine on a basis of the corrected relative distance.

12 Claims, 7 Drawing Sheets

(51) Int. Cl.
    *G01S 13/931*      (2020.01)
    *G01S 19/46*      (2010.01)

(58) Field of Classification Search
    CPC ...... G01S 19/48; G01S 7/4091; G01S 19/396; G01S 7/415; G01S 7/412; G01S 2013/93271; G01S 2013/93275; G01S 17/42; G01C 21/28; G05D 1/02
    See application file for complete search history.

(56) References Cited

U.S. PATENT DOCUMENTS

| | | |
|---|---|---|
| 2012/0299702 A1 | 11/2012 | Edara et al. |
| 2013/0155222 A1 | 6/2013 | Min et al. |
| 2013/0211766 A1* | 8/2013 | Rosenberg ............ G01S 15/06 702/97 |
| 2015/0204976 A1* | 7/2015 | Bosch ................ G01B 11/026 356/4.01 |
| 2016/0061482 A1* | 3/2016 | Mackie ............... F16K 37/0008 251/77 |
| 2016/0349753 A1 | 12/2016 | Tojima et al. |
| 2018/0087907 A1 | 3/2018 | DeBitetto et al. |
| 2021/0341612 A1* | 11/2021 | Tsuji ...................... G01S 17/87 |

FOREIGN PATENT DOCUMENTS

| | | |
|---|---|---|
| JP | 2017-72422 A | 4/2017 |
| JP | 2017-161467 A | 9/2017 |
| WO | 2015/097909 A1 | 7/2015 |

OTHER PUBLICATIONS

Z. Xu et al., "Vehicle autonomous localization in local area of coal mine tunnel based on vision sensors and ultrasonic sensors" PLoS ONE 12(1): 0171012, published Jan. 31, 2017, pp. 1-31. (cited in the Jul. 19, 2021 Office Action issued for Australian Patent Application No. 2019312949).

Office Action dated Jul. 19, 2021, issued for Australian Patent Application No. 2019312949.

\* cited by examiner

[GNSS TRAVELING MODE]

[LANDMARK TRAVELING MODE]

WORK MACHINE CONTROL SYSTEM, WORK MACHINE, AND WORK MACHINE CONTROL METHOD

FIELD

The present invention relates to a work machine control system, work machine, and a work machine control method.

BACKGROUND

In a wide area work site such as a mine, an unmanned work machine may be used. The position of the work machine is detected by using a global navigation satellite system (GNSS). When the detection accuracy of the global navigation satellite system deteriorates, the work machine may stop operating, and the productivity of the work site may decrease. Therefore, a technique is proposed in which a position reference member called a landmark is installed near the traveling path of the mine, and when the detection accuracy of the global navigation satellite system deteriorates, the landmark is detected by a non-contact sensor, and the position of the work machine is calculated.

Patent Literature 1 discloses a technique of detecting a measurement target object in front of the work machine in a traveling direction with an external recognition sensor. In Patent Literature 1, a non-measuring body corresponds to the landmark, and the external recognition sensor corresponds to a non-contact sensor. In Patent Literature 1, the external recognition sensor detects a measurement angle of a measurement target object with respect to a detection axis. The angle of the detection axis of the external recognition sensor is corrected on the basis of the measurement angle detected by the external recognition sensor.

CITATION LIST

Patent Literature

Patent Literature 1: Japanese Laid-open Patent Publication No. 2017-161467

SUMMARY

Technical Problem

There are individual differences in the detection error of the non-contact sensor provided in the work machine. Therefore, it is required to be able to correct the detection error related to the distance of the non-contact sensor while suppressing the decrease in productivity at the work site.

An object of an aspect of the present invention is to correct a non-contact sensor while suppressing a decrease in productivity at a work site.

Solution to Problem

According to an aspect of the present invention, a work machine control system comprises: a non-contact sensor which is provided on a work machine and detects a position of a landmark; a landmark detection position acquisition unit which acquires a detection position of the landmark detected by the non-contact sensor in traveling of the work machine; a landmark registration position storage unit which stores a registration position of the landmark; a first relative distance calculation unit which calculates a first relative distance between the non-contact sensor and the landmark on a basis of the detection position of the landmark; a second relative distance calculation unit which calculates a second relative distance between the non-contact sensor and the landmark on a basis of the registration position of the landmark; a correction value calculation unit which calculates a correction value relating to a relative distance between the non-contact sensor and the landmark on a basis of the first relative distance and the second relative distance; and a landmark correction position calculation unit which corrects the first relative distance on a basis of the correction value and calculates a corrected relative distance between the non-contact sensor and the landmark.

Advantageous Effects of Invention

According to the aspects of the present invention, it is possible to correct the non-contact sensor while suppressing the decrease in productivity at the work site.

DESCRIPTION OF EMBODIMENTS

Hereinafter, embodiments of the invention will be described with reference to the drawings, but the invention is not limited thereto. The components of the embodiments described below can be combined as appropriate. In addition, some components may not be used.

[Management System]

Figure 1:
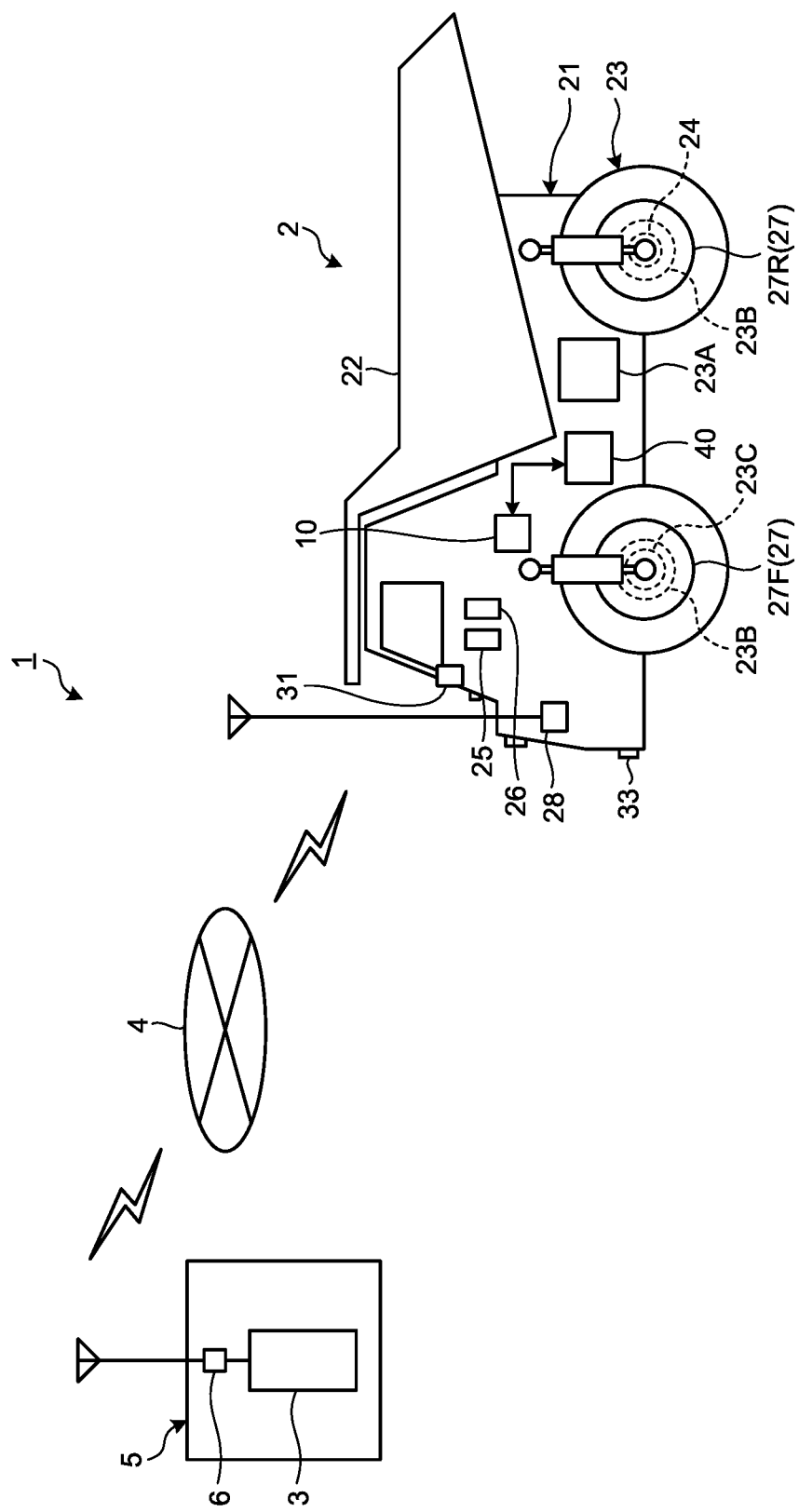
FIG. 1 is a view schematically illustrating an example of a management system and work machine according to this embodiment.

FIG. 1 is a view schematically illustrating an example of a management system 1 and a work machine 2 according to this embodiment. The work machine 2 is an unmanned vehicle. The unmanned vehicle refers to a working vehicle that travels in an unmanned manner on the basis of a control command without depending on a driving operation of a driver. The work machine 2 travels on the basis of the control command from the management system 1. The control command includes traveling condition data.

The work machine 2 operates at a work site. In this embodiment, the work site is a mine or a quarry. The work machine 2 is a dump truck that travels the work site to transport a cargo. The mine is a place or an office where minerals are mined. The quarry is a place or an office where rocks are mined. Examples of the cargo to be transported to the work machine 2 include ore or sediment excavated in the mine or the quarry.

The management system 1 includes a management device 3 and a communication system 4. The management device 3 includes a computer system and is installed in a control facility 5 at the work site. The control facility 5 has an administrator. The communication system 4 communicates between the management device 3 and the work machine 2. A wireless communication device 6 is connected to the management device 3. The communication system 4 includes the wireless communication device 6. The management device 3 and the work machine 2 wirelessly communicate with each other via the communication system 4. The work machine 2 travels on a traveling path HL at the work site on the basis of the traveling condition data transmitted from the management device 3.

[Work Machine]

The work machine 2 includes a vehicle body 21, a dump body 22 supported by the vehicle body 21, a traveling device 23 supporting the vehicle body 21, a speed sensor 24, a direction sensor 25, a posture sensor 26, a wireless communication device 28, a position sensor 31, a non-contact sensor 33, a data processing device 10, and a traveling control device 40.

The vehicle body 21 includes a vehicle body frame and supports the dump body 22. The dump body 22 is a member on which a cargo is loaded.

The traveling device 23 includes wheels 27 and travels on the traveling path HL. The wheels 27 include front wheels 27F and rear wheels 27R. A tire is mounted on the wheel 27. The traveling device 23 includes a drive device 23A, a brake device 23B, and a steering device 23C.

The drive device 23A generates a driving force for accelerating the work machine 2. The drive device 23A includes an internal combustion engine such as a diesel engine. Incidentally, the drive device 23A may include an electric motor. The driving force generated by the drive device 23A is transmitted to the rear wheel 27R, and the rear wheel 27R rotates. The work machine 2 is self-propelled by the rotation of the rear wheels 27R. The brake device 23B generates a braking force for decelerating or stopping the work machine 2. The steering device 23C can adjust the traveling direction of the work machine 2.

The traveling direction of the work machine 2 includes the direction of the front part of the vehicle body 21. The steering device 23C adjusts the traveling direction of the work machine 2 by steering the front wheels 27F.

The speed sensor 24 detects the traveling speed of the work machine 2 in the traveling of the work machine 2. The detection data of the speed sensor 24 includes traveling speed data indicating the traveling speed of the traveling device 23.

The direction sensor 25 detects the direction of the work machine 2 in the traveling of the work machine 2. The detection data of the direction sensor 25 includes detection data indicating the detection of the work machine 2. The direction of the work machine 2 is the traveling direction of the work machine 2. The direction sensor 25 includes a gyro sensor, for example.

The posture sensor 26 detects the posture angle of the work machine 2 in the traveling of the work machine 2. The posture angle of the work machine 2 includes a roll angle and a pitch angle. The roll angle means an inclination angle of the work machine 2 around a rotation axis extending in a front-rear direction of the work machine 2. The pitch angle means an inclination angle of the work machine about a rotation axis extending in a left-right direction of the work machine 2. The detection data of the posture sensor 26 includes posture angle data indicating the posture angle of the work machine 2. The posture sensor 26 includes, for example, an inertial measurement unit (IMU).

The position sensor 31 detects the position of the work machine 2 traveling on the traveling path HL. The detection data of the position sensor 31 includes absolute position data indicating the absolute position of the work machine 2. The absolute position of the work machine 2 is detected by using a global navigation satellite system (GNSS). The position sensor 31 includes a GNSS receiver. The global navigation satellite system detects the absolute position of the work machine 2 defined by coordinate data of latitude, longitude, and altitude. The global navigation satellite system detects the absolute position of the work machine 2 defined in the global coordinate system. The global coordinate system is a coordinate system fixed to the earth.

The non-contact sensor 33 detects an object ahead of the work machine 2 in the traveling direction in the traveling of the work machine 2. Examples of the object ahead of the work machine 2 in the traveling direction include a landmark LM installed near the traveling path HL, a sign board installed near the traveling path HL, and a vehicle different from the work machine 2. The non-contact sensor 33 functions as a landmark sensor which detects, in a non-contact manner, the landmark LM installed near the traveling path HL ahead of the work machine 2 in the traveling direction.

The non-contact sensor 33 includes a radar sensor which scans the object with radio waves. Incidentally, the non-contact sensor 33 may include a laser sensor which scans the object with laser beams.

In the following description, an energy wave, such as a laser beam or a radio wave, which scans the object to detect the object is appropriately referred to as a detection wave.

Incidentally, the work machine 2 may be provided with not only the non-contact sensor 33 which detects the landmark LM but also an obstacle sensor which detects, in a non-contact manner, at least a part of objects around the work machine 2 in the traveling of the work machine 2. Examples of the object detected by the obstacle sensor include an object, such as an obstacle existing on the traveling path HL on which the work machine 2 travels, a rut on the traveling path HL, and a bank (wall surface) existing near the traveling path HL, which has a possibility of interference with the work machine 2 traveling on the traveling path HL.

The wireless communication device 28 wirelessly communicates with the wireless communication device 6 connected to the management device 3. The communication system 4 includes the wireless communication device 28.

The data processing device 10 includes a computer system and is arranged in the vehicle body 21. The data processing device 10 processes at least the detection data of the position sensor 31 and the detection data of the non-contact sensor 33.

The traveling control device 40 includes a computer system and is arranged in the vehicle body 21. The traveling control device 40 controls the traveling state of the traveling device 23 of the work machine 2. The traveling control device 40 outputs an operation command including an accelerator command for operating the drive device 23A, a brake command for operating the brake device 23B, and a steering command for operating the steering device 23C. The drive device 23A generates a driving force for accelerating the work machine 2 on the basis of the accelerator command output from the traveling control device 40. The brake device 23B generates a braking force for decelerating or stopping the work machine 2 on the basis of the brake command output from the traveling control device 40. The steering device 23C generates a swinging force for changing the direction of the front wheels 27F in order to straightly advance or swing the work machine 2 on the basis of the steering command output from the traveling control device 40.

[Traveling Path]

Figure 2:
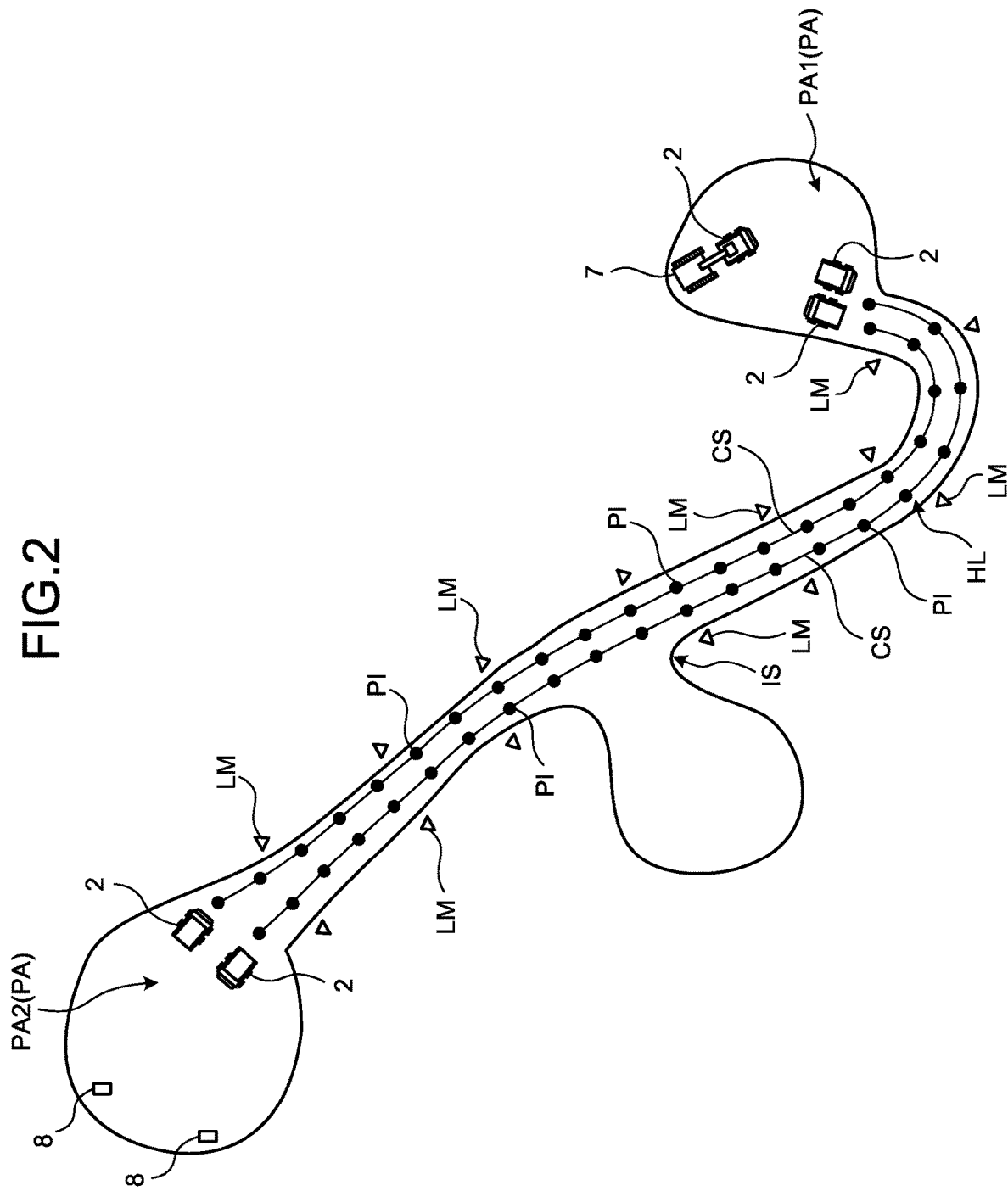
FIG. 2 is a view schematically illustrating a work machine and a traveling path according to the embodiment.

FIG. 2 is a view schematically illustrating the work machine 2 and the traveling path HL according to this embodiment. The traveling path HL leads to a plurality of work areas PA in the mine. The work area PA includes at least one of a loading area PA1 and a dumping area PA2. An intersection IS may be provided on the traveling path HL.

The loading area PA1 refers to an area where a loading work of loading a cargo on the work machine 2 is performed. At the loading area PA1, a loader 7 such as a hydraulic excavator operates. The dumping area PA2 refers to an area where a discharging work of discharging the cargo from the work machine 2 is performed. For example, a crusher 8 is provided at the dumping area PA2.

The management device 3 sets traveling conditions of the work machine 2 on the traveling path HL. The work machine 2 travels on the traveling path HL on the basis of the traveling condition data indicating the traveling conditions transmitted from the management device 3.

The traveling condition data includes the target traveling speed of the work machine 2 and a target traveling course CS. As illustrated in FIG. 2, the traveling condition data includes a plurality of points PI set on the traveling path HL at intervals. The point PI indicates the target position of the work machine 2 defined in the global coordinate system. Incidentally, the point PI may be defined in the local coordinate system of the work machine 2.

The target traveling speed is set for each of the plurality of points PI. The target traveling course CS is defined by a line connecting the plurality of points PI.

A landmark LM is installed near the traveling path HL. The landmark LM is a position reference member detected by the non-contact sensor 33. A plurality of landmarks LM are installed at intervals of, for example, 80 [m] or more and 100 [m] or less. The position of the landmark LM is fixed. That is, the landmark LM is a stationary body.

The landmark LM is installed along the traveling path HL on the bank or the like near the traveling path HL. Incidentally, the landmark LM may be installed in the loading area PA1 or may be installed in the dumping area PA2. In addition, the landmark LM may be installed at any place on the work site.

[Non-Contact Sensor]

Figure 3:
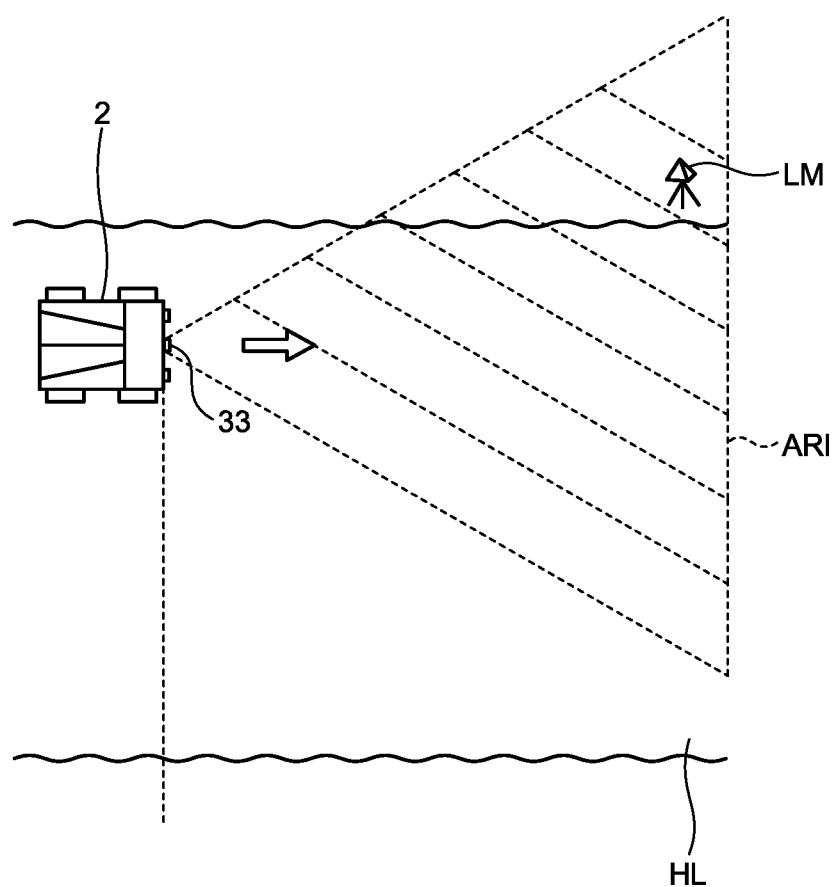
FIG. 3 is a view schematically illustrating an example of a non-contact sensor according to the embodiment.

FIG. 3 is a view schematically illustrating an example of the non-contact sensor 33 according to this embodiment. The non-contact sensor 33 is arranged in the front portion of the vehicle body 21 of the work machine 2. The non-contact sensor 33 may be single or plural. In this embodiment, the work machine 2 is provided with three non-contact sensors 33. Incidentally, the work machine 2 may be provided with five non-contact sensors 33.

The non-contact sensor 33 has a transmitter which can emit a detection wave and a receiver which can receive the detection wave. A detection range AR1 of the non-contact sensor 33 is radial. The detection wave of the non-contact sensor 33 is scanned in the radial detection range AR1. The non-contact sensor 33 scans an object in the detection range AR1 with a detection wave to detect a relative position with respect to the object. When the landmark LM is arranged in the detection range AR1, the non-contact sensor 33 can detect the relative position with respect to the landmark LM. The relative position with respect to the landmark LM includes a relative distance between the work machine 2 and the landmark LM.

The landmark LM has a reflecting surface which reflects the detection wave emitted from the non-contact sensor 33. The reflection intensity (reflectance) of the reflecting surface of the landmark LM with respect to the detection wave (radio wave) is higher than the reflection intensity (reflectance) of an object around the landmark LM. Examples of the objects around the landmark LM include a rock of a mine and a bank. The non-contact sensor 33 can separately detect the landmark LM and the object around the landmark LM by emitting a detection wave forward in the traveling direction of the work machine 2 and receiving the detection wave reflected by the object.

Incidentally, the landmark LM may not have a reflecting surface as long as the absolute position can be detected using the global navigation satellite system.

[Control System]

Figure 4:
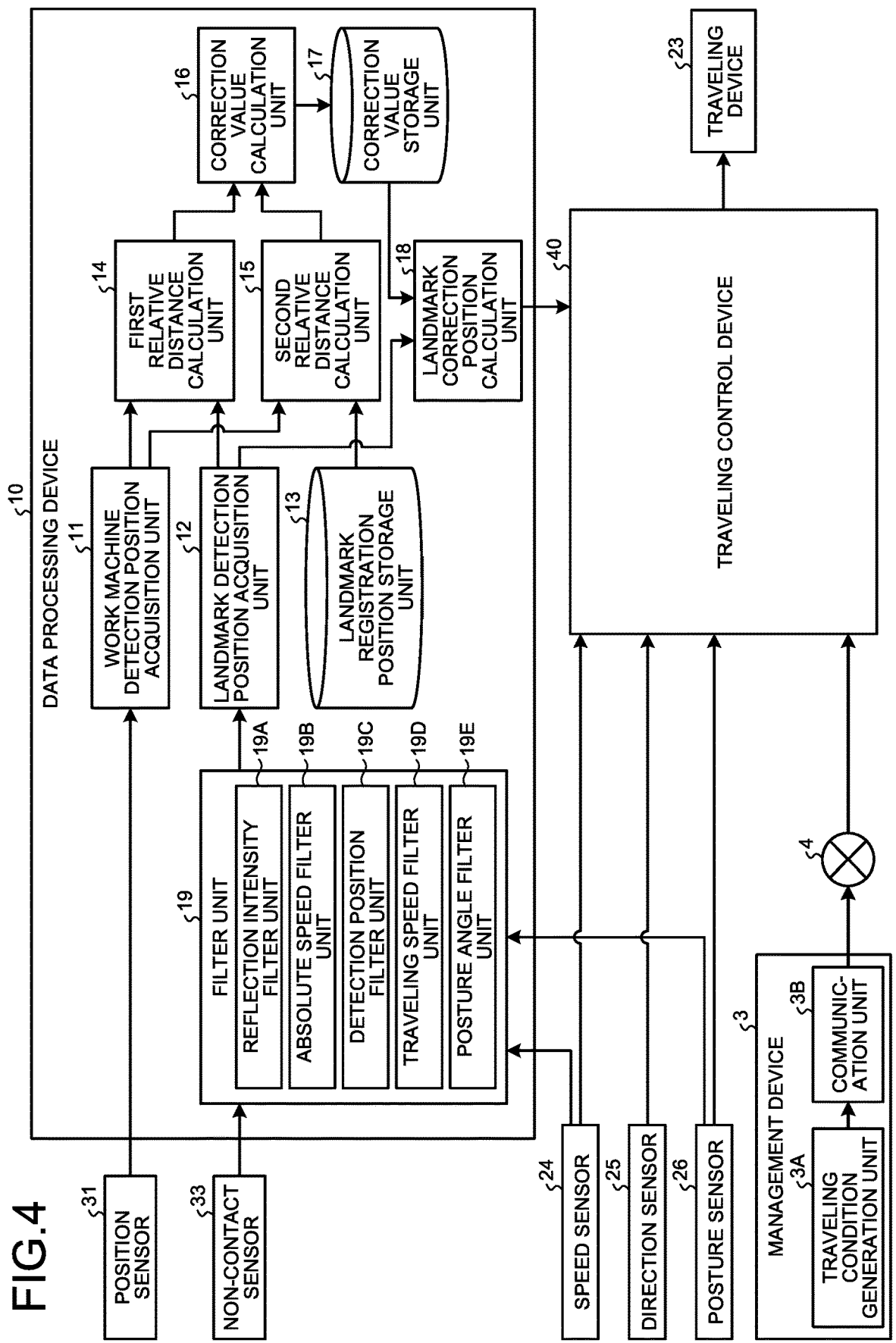
FIG. 4 is a functional block diagram illustrating a work machine control system according to the embodiment.

FIG. 4 is a functional block diagram illustrating a control system 9 of the work machine 2 according to this embodiment. The control system 9 includes a data processing device 10 and the traveling control device 40. Each of the data processing device 10 and the traveling control device 40 can communicate with the management device 3 via the communication system 4.

The management device 3 includes a traveling condition generation unit 3A and a communication unit 3B. The traveling condition generation unit 3A generates traveling condition data indicating the traveling conditions of the work machine 2. The traveling condition is determined by, for example, an administrator who is present in the control facility. The administrator operates an input device connected to the management device 3. The traveling condition generation unit 3A generates the traveling condition data on the basis of the input data generated by operating the input device. The communication unit 3B transmits the traveling condition data to the work machine 2. The traveling control device 40 of the work machine 2 acquires the traveling condition data transmitted from the communication unit 3B via the communication system 4.

<Data Processing Device>

The data processing device 10 includes a work machine detection position acquisition unit 11, a landmark detection position acquisition unit 12, a landmark registration position storage unit 13, a first relative distance calculation unit 14, and a second relative distance calculation unit 15, a correction value calculation unit 16, a correction value storage unit 17, a landmark correction position calculation unit 18, and a filter unit 19.

The work machine detection position acquisition unit 11 acquires the detection position of the work machine 2 detected by the position sensor 31 in traveling of the work machine 2. The detection position of the work machine 2 indicates the absolute position of the work machine 2 detected by the position sensor 31. The absolute position of the work machine 2 indicates the absolute position of the reference point defined for the work machine 2. An example of the reference point of the work machine 2 is the center point of the rear axle for transmitting power to the rear wheels 27R. Incidentally, the reference point of the work machine 2 may be set to any portion of the work machine 2. Further, the position sensor 31 outputs a positioning signal indicating that the work machine 2 can be positioned and a non-positioning signal indicating that the work machine 2 cannot be positioned. The work machine detection position acquisition unit 11 acquires the positioning signal or the non-positioning signal from the position sensor 31.

The landmark detection position acquisition unit 12 acquires the detection position of the landmark LM detected by the non-contact sensor 33 in traveling of the work machine 2. The detection position of the landmark LM indicates a relative position, which is detected by the non-contact sensor 33, between the non-contact sensor 33 and the landmark LM. The relative position between the non-contact sensor 33 and the landmark LM includes the distance and direction from the non-contact sensor 33 to the reflecting surface of the landmark LM.

The landmark registration position storage unit 13 stores the registration position of the landmark LM. The registration position of the landmark LM indicates the absolute position of the landmark LM detected in advance. For example, the landmark LM is installed near the traveling path HL by a worker. After installing the landmark LM near the traveling path LM, the worker detects the absolute position of the landmark LM by using a position detection device including a GNSS receiver. The worker registers the absolute position of the detected landmark LM in the landmark registration position storage unit 13. The landmark registration position storage unit 13 stores the registration position indicating the absolute position of the landmark LM.

The first relative distance calculation unit 14 calculates a first relative distance La between the non-contact sensor 33 and the landmark LM on the basis of the detection position LMs of the landmark LM acquired by the landmark detection position acquisition unit 12.

The second relative distance calculation unit 15 calculates a second relative distance Lb between the non-contact sensor 33 and the landmark LM on the basis of the detection position of the work machine 2 acquired by the work machine detection position acquisition unit 11, a predetermined relative position between the mounting position of the non-contact sensor 33 and the reference point of the work machine 2, and the registration position of the landmark LM stored in the landmark registration position storage unit 13. As described above, the absolute position of the reference point of the work machine 2 is detected by the position sensor 31. The mounting position of the non-contact sensor 33 in the work machine 2 and the relative position between the mounting position of the non-contact sensor 33 and the reference point of the work machine 2 are known data which can be derived from the design data or specification data of the work machine 2. The second relative distance calculation unit 15 can calculate the absolute position of the non-contact sensor 33 on the basis of the detection position of the work machine 2 indicating the absolute position of the work machine 2 detected by the position sensor 31 and the known mounting position of the non-contact sensor 33.

Figure 5:
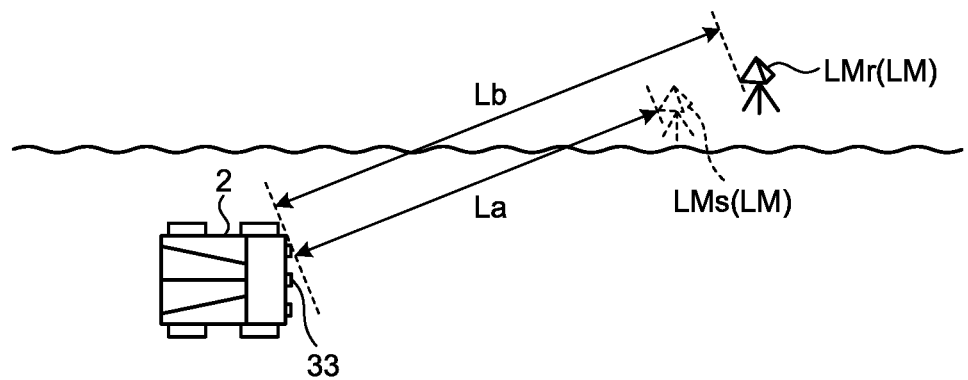
FIG. 5 is a schematic view for explaining a process of a data processing device according to the embodiment.

FIG. 5 is a schematic view for explaining a process of the first relative distance calculation unit 14 and the second relative distance calculation unit 15 of the data processing device 10 according to this embodiment. As illustrated in FIG. 5, the first relative distance La indicates the distance, which is detected by the non-contact sensor 33, between the non-contact sensor 33 and the detection position LMs of the landmark LM. The second relative distance Lb indicates a distance between the absolute position, which is calculated from the detection position of the work machine 2 indicating the absolute position of the work machine 2 detected by the position sensor 31 and the known mounting position of the non-contact sensor 33, of the non-contact sensor 33 and a registration position LMr of the landmark LM indicating the absolute position of the landmark LM stored in the landmark registration position storage unit 13.

The detection position of the work machine 2 is detected with high accuracy by the position sensor 31. The registration position LMr of the landmark LM is detected with high accuracy by the position detection device including the GNSS receiver. The detection position LMs (first relative distance La) of the landmark LM detected by the non-contact sensor 33 may have an error. The detection position LMs (first relative distance La) of the landmark LM may vary for each of the plurality of non-contact sensors 33. Further, in a case where the non-contact sensor 33 detects the detection position LMs (first relative distance La) of the landmark LM in a state where the work machine 2 is travelling, the detection position LMs (first relative distance La) of the landmark LM is likely to have an error.

In other words, the detection error of the non-contact sensor 33 is highly likely to have individual differences. In particular, the detection error of the non-contact sensor 33 when detecting the first relative distance La with respect to the landmark LM is highly likely to appear significantly in the traveling state of the work machine 2.

In other words, the error of the second relative distance Lb with respect to the true relative distance between the non-contact sensor 33 and the landmark LM is small, but the error of the first relative distance La with respect to the true relative distance between the non-contact sensor 33 and the landmark LM is highly likely to be large.

The correction value calculation unit 16 calculates a correction value G relating to the relative distance between the non-contact sensor 33 and the landmark LM on the basis of the first relative distance La calculated by the first relative distance calculation unit 14 and the second relative distance Lb calculated by the second relative distance calculation unit 15.

The correction value calculation unit 16 calculate the correction value G relating to the relative distance between the work machine 2 and the landmark LM on the basis of the first relative distance La which is likely to have an error and the second relative distance Lb close to the true relative distance. In this embodiment, the correction value G is expressed by the ratio of the first relative distance La and the second relative distance Lb (G=Lb/La).

For example, in a case where the second relative distance Lb is 102 [m], and the first relative distance La is 100 [m], the correction value G is 1.02.

Incidentally, the correction value calculation unit 16 may calculate the correction value G on the basis of the plurality of first relative distances La and the plurality of second relative distances Lb. A more appropriate correction value G can be calculated on the basis of the plurality of first relative distances La. For example, in a case where the work machine 2 travels on the same traveling path HL multiple times, the non-contact sensor 33 does not always detect the relative distance to the same portion (detection point) on the same landmark LM. For example, even in a case where the non-contact sensor 33 detects an inappropriate detection point of the landmark LM in the first traveling on the traveling path HL by calculating the correction value G on the basis of the plurality of first relative distances La, the appropriate correction value G can be calculated when the non-contact sensor 33 detects the appropriate detection point of the landmark LM in the second and subsequent traveling on the traveling path HL.

Figure 6:
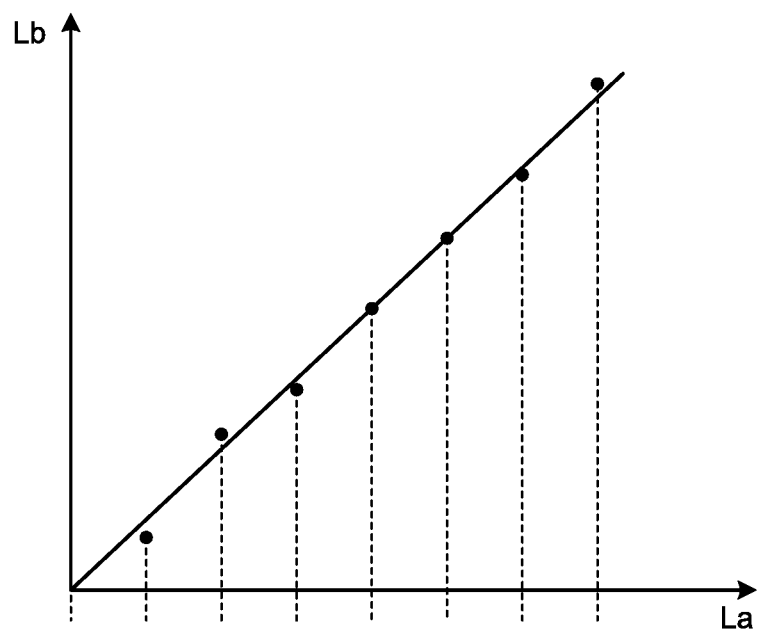
FIG. 6 is a schematic diagram for explaining the process of the data processing device according to the embodiment.

FIG. 6 is a schematic diagram for explaining the process of the correction value calculation unit 16 of the data processing device 10 according to this embodiment. In FIG.

6, a horizontal axis indicates the first relative distance La, and a vertical axis indicates the second relative distance Lb. In this embodiment, the non-contact sensor 33 detects the landmark LM in a state where the work machine 2 is traveling. In a case where the landmark LM exists in front of the work machine 2 in the traveling direction, the non-contact sensor 33 gradually approaches the landmark LM as the work machine 2 travels. That is, the non-contact sensor 33 sequentially detects the landmark LM in a state where the relative distance between the work machine 2 and the landmark LM is changing.

The first relative distance calculation unit 14 calculates the plurality of first relative distances La between the non-contact sensor 33 and the landmark LM on the basis of the plurality of detection positions, which is detected by the position sensor 31 in the traveling state of the work machine 2, in the traveling direction of the work machine 2 and the plurality of detection positions LMs of the landmark LM detected by the non-contact sensor 33 in the traveling state of the work machine 2.

The second relative distance calculation unit 15 calculates the plurality of second relative distances Lb between the non-contact sensor 33 and the landmark LM on the basis of the plurality of detection positions of the work machine 2 detected by the position sensor 31 and the registration position LMr of the landmark LM stored in the landmark registration position storage unit 13.

When the first relative distance calculation unit 14 calculates the plurality of first relative distances La, and the second relative distance calculation unit 15 calculates the plurality of second relative distances Lb, plot points which respectively corresponds to the plurality of detection positions in the traveling direction of the work machine 2 and indicate the relationship between the first relative distance La and the second relative distance Lb are derived as illustrated in FIG. 6. The correction value calculation unit 16 calculates an approximate curve by a least-squares method on the basis of the plurality of plot points. In this embodiment, the correction value calculation unit 16 calculates, as an approximate curve, the slope of a straight line passing through the origin from the plurality of plot points. The slope of the straight line corresponds to the correction value G. In this way, the correction value calculation unit 16 derives the plot points which respectively correspond to the plurality of detection positions of the work machine 2 in the traveling direction and indicate the relationship between the first relative distance La and the second relative distance Lb, and may calculate the correction value G by the least-squares method.

The correction value storage unit 17 stores the correction value G calculated by the correction value calculation unit 16.

The landmark correction position calculation unit 18 corrects the first relative distance La, which is calculated by the first relative distance calculation unit 14, between the non-contact sensor 33 and the landmark LM on the basis of the correction value G stored in the correction value storage unit 17 to calculate a corrected relative distance Lc between the non-contact sensor 33 and the landmark LM.

Figure 7:
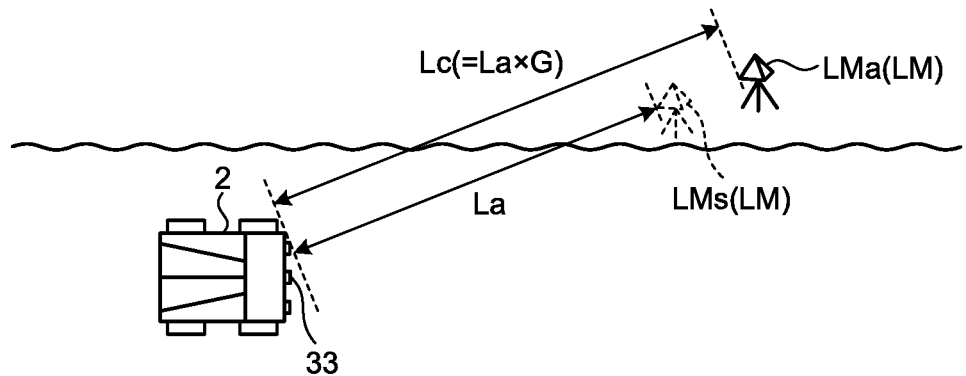
FIG. 7 is a schematic view for explaining the process of the data processing device according to the embodiment.

FIG. 7 is a schematic view for explaining the process of the landmark correction position calculation unit 18 of the data processing device 10 according to this embodiment. The landmark correction position calculation unit 18 corrects the first relative distance La, which is calculated by the first relative distance calculation unit 14, between the non-contact sensor 33 and the landmark LM on the basis of the correction value G stored in the correction value storage unit 17 to calculate a corrected relative distance Lc. In this embodiment, the corrected relative distance Lc is expressed by the product of the correction value G and the first relative distance La (Lc=La×G).

For example, in a case where the correction value G is 1.02, and the first relative distance La is calculated to be 50 [m], the corrected relative distance Lc is 51 [m].

The landmark correction position calculation unit 18 corrects the detection position LMs of the landmark LM acquired by the landmark detection position acquisition unit 12 on the basis of the corrected relative distance Lc to calculate the correction position LMa.

The filter unit 19 performs a filter process of outputting detection data satisfying the defined condition from the detection data of the non-contact sensor 33 to the landmark detection position acquisition unit 12. The landmark detection position acquisition unit 12 acquires the detection data, which satisfies the defined condition, of the non-contact sensor 33 as the detection position LMs of the landmark LM. That is, the landmark detection position acquisition unit 12 acquires the detection data, which is determined in the filter unit 19 to satisfy the defined condition and passes the filter unit 19, of the non-contact sensor 33 as the detection position LMs of the landmark LM. The filter unit 19 does not output the detection data, which does not satisfy the defined condition, of the non-contact sensor 33 to the landmark detection position acquisition unit 12.

The filter unit 19 includes a reflection intensity filter unit 19A, an absolute speed filter unit 19B, a detection position filter unit 19C, a traveling speed filter unit 19D, and a posture angle filter unit 19E.

The non-contact sensor 33 can detect the reflection intensity of the detection wave reflected by the object by irradiating the object with the detection wave in the traveling of the work machine 2 and receiving the detection wave reflected by the object. The defined condition includes that the reflection intensity is equal to or greater than a reflection intensity threshold. The reflection intensity threshold is determined in advance and held in the reflection intensity filter unit 19A. The reflection intensity filter unit 19A acquires the detection data of the non-contact sensor 33 and calculates the reflection intensity of the detection wave derived from the detection data of the non-contact sensor 33. As described above, the reflection intensity of the reflecting surface of the landmark LM with respect to the detection wave is higher than the reflection intensity of the object around the landmark LM. When the reflection intensity of the detection wave is equal to or greater than the reflection intensity threshold, the reflection intensity filter unit 19A determines that the object which reflects the detection wave is the landmark LM. On the other hand, the reflection intensity filter unit 19A determines that the object which reflects the detection wave is an object other than the landmark LM when the reflection intensity of the detection wave is less than the reflection intensity threshold. In a case where it is determined on the basis of the detection data of the non-contact sensor 33 that the object detected by the non-contact sensor 33 is the landmark LM, the reflection intensity filter unit 19A outputs the detection data of the non-contact sensor 33 to the landmark detection position acquisition unit 12. The landmark detection position acquisition unit 12 acquires the detection data of the non-contact sensor 33 output from the reflection intensity filter unit 19A as the detection position LMs of the landmark LM.

The non-contact sensor 33 can detect the relative speed with respect to the object by irradiating the object with the detection wave in the traveling of the work machine 2 and receiving the detection wave reflected by the object. The defined condition includes that the absolute speed of the object calculated from the relationship between the relative speed to the object and the traveling speed of the work machine 2 detected by the speed sensor 24 is less than an absolute speed threshold. The absolute speed threshold is determined in advance and held in the absolute speed filter unit 19B. The absolute speed filter unit 19B acquires the detection data of the non-contact sensor 33 and calculates the absolute speed of the object from the relationship between the relative speed to the object derived from the detection data of the non-contact sensor 33 and the traveling speed of the work machine 2 detected by the speed sensor 24. As described above, the landmark LM is a stationary body. On the other hand, a vehicle different from the work machine 2 may travel in front of the work machine 2. The different vehicle is a moving body. The absolute speed of the landmark LM is lower than the absolute speed of the different vehicle. When the absolute speed of the object is less than the absolute speed threshold, the absolute speed filter unit 19B determines that the object which reflects the detection wave is the landmark LM. On the other hand, when the absolute speed of the object is equal to or greater than the absolute speed threshold, the absolute speed filter unit 19B determines that the object which reflects the detection wave is an object (a vehicle different from the work machine 2) other than the landmark LM. In a case where it is determined that the object detected by the non-contact sensor 33 is the landmark LM, the absolute speed filter unit 19B outputs the detection data of the non-contact sensor 33 to the landmark detection position acquisition unit 12. The landmark detection position acquisition unit 12 acquires the detection data of the non-contact sensor 33 output from the absolute speed filter unit 19B as the detection position LMs of the landmark LM.

The non-contact sensor 33 can detect the detection position of the object by irradiating the object with the detection wave in the traveling of the work machine 2 and receiving the electric detection wave reflected by the object. The detection position of the object is the absolute position of the object. The absolute position of the work machine 2 is detected by the position sensor 31. The relative position between the non-contact sensor 33 and the object is detected by the non-contact sensor 33. Therefore, the non-contact sensor 33 can detect the detection position indicating the absolute position of the object on the basis of the absolute position of the work machine 2, the known mounting position of the non-contact sensor 33, and the relative position between the non-contact sensor 33 and the object. The defined condition includes that a deviation between the detection position of the object and the registration position of the landmark LM is less than a deviation threshold. The deviation threshold is predetermined and held in the detection position filter unit 19C. The registration position of the landmark LM is the absolute position of the landmark LM. When the deviation between the detection position of the object and the registration position of the landmark LM is less than the deviation threshold, that is, when the detection position of the object matches or approximates the registration position of the landmark LM, the detection position filter unit 19C determines that the object which reflects the detection wave is the landmark LM. On the other hand, when the deviation between the detection position of the object and the registration position of the landmark LM is equal to or greater than the deviation threshold, that is, when the detection position of the object and the registration position of the landmark LM are apart, the detection position filter unit 19C determines that the object which reflects the detection wave is an object other than the landmark LM. When it is determined that the object detected by the non-contact sensor 33 is the landmark LM, the detection position filter unit 19C outputs the detection data of the non-contact sensor 33 to the landmark detection position acquisition unit 12. The landmark detection position acquisition unit 12 acquires the detection data of the non-contact sensor 33 output from the detection position filter unit 19C as the detection position LMs of the landmark LM.

The non-contact sensor 33 detects an object in the traveling of the work machine 2. The defined condition includes that the traveling speed of the work machine 2 when the non-contact sensor 33 detects the object is less than a traveling speed threshold. The traveling speed threshold is determined in advance and held in the traveling speed filter unit 19D. The traveling speed filter unit 19D acquires the detection data of the speed sensor 24 and acquires the traveling speed of the work machine 2 when the non-contact sensor 33 detects the object. When the work machine 2 is traveling at high speed, for example, the vibration of the vehicle body 21 is highly likely to increase. In a case where the vibration of the vehicle body 21 is large, the detection accuracy of the non-contact sensor 33 may deteriorate. On the other hand, when the work machine 2 is traveling at a low speed, the deterioration in the detection accuracy of the non-contact sensor 33 is suppressed. When the traveling speed of the work machine 2 is less than the traveling speed threshold, the traveling speed filter unit 19D determines that the deterioration in the detection accuracy of the non-contact sensor 33 is suppressed. On the other hand, when the traveling speed of the work machine 2 is equal to or greater than the traveling speed threshold, the traveling speed filter unit 19D determines that the detection accuracy of the non-contact sensor 33 deteriorates. In a case where it is determined that the detection data of the non-contact sensor 33 is acquired when the traveling speed of the work machine 2 is less than the traveling speed threshold, the traveling speed filter unit 19D outputs the detection data of the non-contact sensor 33 to the landmark detection position acquisition unit 12. The landmark detection position acquisition unit 12 acquires the detection data output from the traveling speed filter unit 19D as the detection position LMs of the landmark LM.

The non-contact sensor 33 detects an object in the traveling of the work machine 2. The defined condition includes that the posture angle of the work machine 2 when the non-contact sensor 33 detects the object is less than an angle threshold. The angle threshold is predetermined and held in the posture angle filter unit 19E. The posture angle filter unit 19E acquires the detection data of the direction sensor 25 and the posture sensor 26 and acquires the posture angle of the work machine 2 when the non-contact sensor 33 detects the object. For example, in a case where the work machine 2 travels on a rough road or on a steep curve course, the posture angle of the work machine 2 is highly likely to be large. Further, in a loaded state where the dump body 22 is loaded, the posture angle in the traveling of the work machine 2 is likely to be large, and in an empty state where the dump body 22 is not loaded, the posture angle in the traveling of the work machine 2 is highly likely to be small. In a case where the posture angle of the work machine 2 is large, the detection accuracy of the non-contact sensor 33 may deteriorate. On the other hand, when the posture angle of the work machine 2 is small, the deterioration in the detection accuracy of the non-contact sensor 33 is suppressed. When the posture angle of the work machine 2 is less than the angle threshold, the posture angle filter unit 19E determines that the deterioration in the detection accuracy of the non-contact sensor 33 is suppressed. On the other hand, when the posture angle of the work machine 2 is equal to or greater than the angle threshold, the posture angle filter unit 19E determines that the detection accuracy of the non-contact sensor 33 deteriorates. In a case where it is determined that the detection data of the non-contact sensor 33 is acquired when the posture angle of the work machine 2 is less than the angle threshold, the posture angle filter unit 19E outputs the detection data of the non-contact sensor 33 to the landmark detection position acquisition unit 12. The landmark detection position acquisition unit 12 acquires the detection data output from the posture angle filter unit 19E as the detection position LMs of the landmark LM.

<Traveling Control Device>

The traveling control device 40 controls the traveling device 23 so that the work machine 2 travels according to the traveling condition data generated by the management device 3. In this embodiment, the traveling control device 40 causes the work machine 2 to travel on the basis of at least one traveling mode of a GNSS traveling mode and a landmark traveling mode.

The GNSS traveling mode is a traveling mode which is executed when a positioning signal is acquired from the position sensor 31, and the detection accuracy of the absolute position of the work machine 2 detected by the position sensor 31 is high. The landmark traveling mode is a traveling mode that is executed when the non-positioning signal is acquired from the position sensor 31, and the detection accuracy of the absolute position of the work machine 2 detected by the position sensor 31 deteriorates.

Incidentally, examples of the cause of the deterioration in the detection accuracy of the position sensor 31 include an ionospheric abnormality due to a solar flare and an abnormality in communication with the global navigation satellite system. For example, in a work site such as an open pit or an underground mine, there is a high possibility that the abnormality in communication with the global navigation satellite system occurs. Further, even in a case where there is an obstacle at the work site or around the work site, there is a high possibility that the abnormality in communication with the global navigation satellite system occurs.

The traveling control device 40 acquires the positioning signal from the position sensor 31, and causes the work machine 2 in the GNSS traveling mode when it is determined that the detection accuracy of the absolute position of the work machine 2 detected by the position sensor 31 is high. In the GNSS traveling mode, the traveling control device 40 causes the work machine 2 to travel while correcting the position of the work machine 2 on the basis of the detection position of the work machine 2 detected by the position sensor 31 and the traveling condition data generated by the traveling condition generation unit 3A.

The traveling control device 40 acquires the non-positioning signal from the position sensor 31, and causes the work machine 2 in the landmark traveling mode when it is determined that the detection accuracy of the absolute position of the work machine 2 detected by the position sensor 31 deteriorates. In the landmark traveling mode, the traveling control device 40 causes the work machine 2 to travel while correcting the position of the work machine 2 on the basis of the detection position of the landmark LM detected by the non-contact sensor 33, the registration position of the landmark LM stored in the landmark registration position storage unit 13, and the traveling condition data generated by the traveling condition generation unit 3A.

[Traveling Method of Work Machine]

Next, an example of a traveling method of the work machine 2 according to this embodiment will be described. The traveling control device 40 controls the traveling device 23 on the basis of the traveling condition data transmitted from the management device 3. In this embodiment, the work machine 2 travels on the traveling path HL on the basis of dead reckoning.

The dead reckoning refers to navigation in which traveling is performed while the current position of the work machine 2 is estimated on the basis of the movement distance and direction (direction change amount) of the work machine 2 from a starting point with known longitude and latitude. The movement distance of the work machine 2 is detected by the speed sensor 24. The direction of the work machine 2 is detected by the direction sensor 25. The traveling control device 40 controls the traveling device 23 while acquiring the detection data of the speed sensor 24 and the detection data of the direction sensor 25, calculating the movement distance and the direction change amount of the work machine 2 from a known starting point, and estimating the current position of the work machine 2. In the following description, the current position of the work machine 2 which is estimated on the basis of the detection data of the speed sensor 24 and the detection data of the direction sensor 25 is appropriately referred to as an estimated position.

In the dead reckoning, the traveling control device 40 calculates the estimated position of the work machine 2 on the basis of the detection data of the speed sensor 24 and the detection data of the direction sensor 25 and controls the traveling device 23 such that the work machine 2 travels according to the target traveling course CS.

In the dead reckoning, when the traveling distance of the work machine 2 increase, an error may occur between the estimated position and the actual position of the work machine 2 due to the accumulation of the detection error of one or both of the speed sensor 24 and the direction sensor 25. As a result, the work machine 2 may deviate from the target traveling course CS.

In this embodiment, the traveling control device 40 corrects the estimated position of the work machine 2 traveling by dead reckoning. In the GNSS traveling mode, the traveling control device 40 corrects the estimated position of the work machine 2 traveling by dead reckoning on the basis of the detection data of the position sensor 31. In the landmark traveling mode, the traveling control device 40 corrects the estimated position of the work machine 2 traveling by dead reckoning on the basis of the detection data of the non-contact sensor 33. In this embodiment, the traveling control device 40 corrects the estimated position of the work machine 2 traveling by dead reckoning on the basis of the corrected relative distance Lc calculated from the detection data of the non-contact sensor 33 in the landmark traveling mode.

A method of correcting the estimated position of the work machine 2 in the GNSS traveling mode will be described. In a case where the detection accuracy of the global navigation satellite system (GNSS) is high, the traveling control device 40 causes the work machine 2 to travel in the GNSS traveling mode. In the GNSS traveling mode, the traveling control device 40 causes the work machine 2 to travel while correcting the estimated position of the work machine 2 traveling by dead reckoning by using the detection position (absolute position) of the work machine 2 detected by the position sensor 31.

The traveling control device 40 corrects the estimated position of the work machine 2 on the basis of the detection data of the speed sensor 24, the detection data of the direction sensor 25, and the detection data of the position sensor 31. The traveling control device 40 controls the traveling of the work machine 2 on the basis of the corrected estimated position such that the work machine 2 travels according to the target traveling course CS.

Next, a method of correcting the estimated position of the work machine 2 in the landmark traveling mode will be described. In a case where the detection accuracy of the global navigation satellite system (GNSS) deteriorates, the traveling control device 40 causes the work machine 2 to travel in the landmark traveling mode. In the landmark traveling mode, the traveling control device 40 causes the work machine 2 to travel while correcting the estimated position of the work machine 2 traveling by dead reckoning by using the first relative distance La (the detection position LMs of the landmark LM), which is detected by the non-contact sensor 33, between the work machine 2 and the landmark LM and the registration position LMr of the landmark LM stored in the landmark registration position storage unit 13.

In the landmark traveling mode, the non-contact sensor 33 emits the detection wave in a state where the work machine 2 is traveling. The non-contact sensor 33 receives the detection wave reflected by the object. The detection data of the non-contact sensor 33 is output to the filter unit 19. In the filter unit 19, the detection data based on the detection wave reflected by the landmark LM is output to the landmark detection position acquisition unit 12, and the detection data based on the detection wave reflected by an object other than the landmark LM is not output to the landmark detection position acquisition unit 12.

As described with reference to FIG. 7, in this embodiment, the landmark correction position calculation unit 18 corrects the first relative distance La on the basis of the correction value G stored in the correction value storage unit 17 to calculate the corrected relative distance Lc between the work machine 2 and the landmark LM. The landmark correction position calculation unit 18 corrects the detection position LMs of the landmark LM acquired by the landmark detection position acquisition unit 12 on the basis of the corrected relative distance Lc to calculate the correction position LMa.

The traveling control device 40 causes the work machine 2 to travel while correcting the estimated position of the work machine 2 traveling by dead reckoning by using the corrected relative distance Lc (the correction position LMa of the landmark LM) between the work machine 2 and the landmark LM and the registration position LMr of the landmark LM stored in the landmark registration position storage unit 13.

The traveling control device 40 compares the correction position LMa with the registration position LMr. The traveling control device 40 corrects the estimated position of the work machine 2 on the basis of the result of comparison between the correction position LMa and the registration position LMr. For example, the traveling control device 40 calculates the correction amount of the estimated position on the basis of the difference between the correction position LMa and the registration position LMr. That is, the traveling control device 40 corrects the estimated position of the work machine 2 on the basis of the detection data of the speed sensor 24, the detection data of the direction sensor 25, the relative position data which includes the corrected relative distance Lc calculated from the detection data of the non-contact sensor 33 between the non-contact sensor 33 and the landmark LM, and the registration position LMr of the landmark LM stored in the landmark registration position storage unit 13. The traveling control device 40 controls the traveling of the work machine 2 such that the estimated position of the work machine 2 after correction matches the target traveling course CS.

[Control Method]

Figure 8:
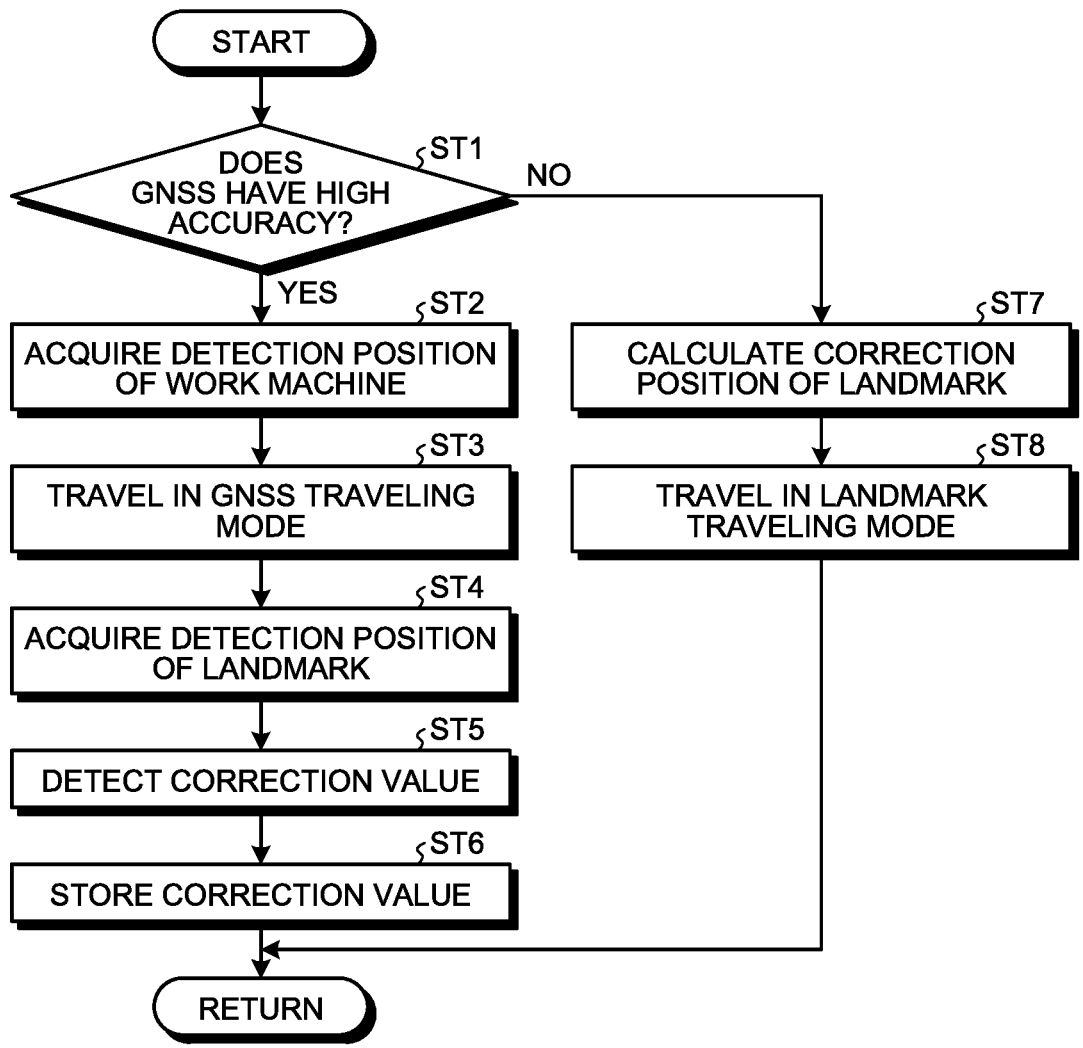
FIG. 8 is a flowchart illustrating a work machine control method according to the embodiment.

Next, a method of controlling the work machine 2 according to this embodiment will be described. FIG. 8 is a flowchart illustrating a map data creating method according to this embodiment.

The work machine 2 travels on the traveling path HL by dead reckoning. In the traveling of the work machine 2, the position sensor 31 detects the position of the work machine 2. When the work machine 2 can be positioned, the position sensor 31 outputs the positioning signal, and when the work machine 2 cannot be positioned, the position sensor 31 outputs the non-positioning signal.

The work machine detection position acquisition unit 11 acquires the positioning signal or the non-positioning signal from the position sensor 31. The positioning signal or the non-positioning signal acquired by the work machine detection position acquisition unit 11 is output to the traveling control device 40. On the basis of the positioning signal or the non-positioning signal, the traveling control device 40 determines whether or not the detection accuracy of the global navigation satellite system (GNSS) is high (Step ST1).

In Step ST1, the positioning signal is acquired, and when it is determined that the detection accuracy of the global navigation satellite system (GNSS) is high (Step ST1: Yes), the work machine detection position acquisition unit 11 acquires the detection position of the work machine 2 detected by the position sensor 31 in the traveling of the work machine 2 traveling on the traveling path HL (Step ST2).

In a case where it is determined that the detection accuracy of the global navigation satellite system (GNSS) is high, the traveling control device 40 causes the work machine 2 to travel in the GNSS traveling mode (Step ST3).

As described above, in the GNSS traveling mode, the traveling control device 40 causes the work machine 2 to travel while correcting the estimated position of the work machine 2 traveling by dead reckoning by using the detection position of the work machine 2 detected by the position sensor 31.

As illustrated in FIG. 5, in the GNSS traveling mode, the non-contact sensor 33 detects the landmark LM. The non-contact sensor 33 reflects the detection wave and detects the landmark LM in a state where the work machine 2 is traveling. The detection data of the non-contact sensor 33 is output to the filter unit 19. The filter unit 19 performs a filter process of outputting detection data satisfying the defined condition from the detection data of the non-contact sensor 33 to the landmark detection position acquisition unit 12. In traveling of the work machine 2, the landmark detection position acquisition unit 12 acquires the detection position LMs of the landmark LM detected by the non-contact sensor 33 through the filter unit 19 (Step ST4).

In the GNSS traveling mode, the detection position of the work machine 2 is detected with high accuracy. As described with reference to FIG. 5, the first relative distance calculation unit 14 calculates the first relative distance La between the non-contact sensor 33 and the landmark LM on the basis of the detection position of the work machine 2 acquired in Step ST2 and the detection position LMs of the landmark LM acquired in Step ST4.

The second relative distance calculation unit 15 calculates the second relative distance Lb between the non-contact sensor 33 and the landmark LM on the basis of the detection position of the work machine 2 acquired in Step ST2 and the registration position LMr of the landmark LM stored in advance in the landmark registration position storage unit 13.

The correction value calculation unit 16 calculates the correction value G relating to the relative distance between the non-contact sensor 33 and the landmark LM on the basis of the first relative distance La and the second relative distance Lb (Step ST5).

As described above, in this embodiment, the correction value G is expressed by the ratio of the first relative distance La and the second relative distance Lb (G=Lb/La). Further, as described with reference to FIG. 6, the correction value calculation unit 16 derives the plot points which respectively correspond to the plurality of detection positions of the work machine 2 and indicate the relationship between the first relative distance La and the second relative distance Lb, and may calculate the correction value G by the least-squares method.

The correction value storage unit 17 stores the correction value G calculated in Step ST5 (Step ST6).

As described above, the correction value G is calculated when the work machine 2 is operating in the GNSS traveling mode.

Even in a case where the detection accuracy of the global navigation satellite system (GNSS) deteriorates, the non-contact sensor 33 detects the landmark LM in a state where the work machine 2 is traveling. The first relative distance calculation unit 14 calculates the first relative distance La on the basis of the detection data of the non-contact sensor 33.

In Step ST1, the non-positioning signal is acquired, and in a case where it is determined that the detection accuracy of the global navigation satellite system (GNSS) deteriorates (Step ST1: No), the landmark correction position calculation unit 18 corrects the first relative distance La on the basis of the correction value G stored in the correction value storage unit 17 to calculate the corrected relative distance Lc between the non-contact sensor 33 and the landmark LM. Further, the landmark correction position calculation unit 18 corrects the detection position LMs of the landmark LM acquired by the landmark detection position acquisition unit 12 on the basis of the corrected relative distance Lc to calculate the correction position LMa (Step ST7).

In a case where it is determined that the detection accuracy of the global navigation satellite system (GNSS) deteriorates, the traveling control device 40 causes the work machine 2 to travel in the landmark traveling mode (Step ST8).

As described above, in the landmark traveling mode, the traveling control device 40 causes the work machine 2 to travel while correcting the estimated position of the work machine 2 traveling by dead reckoning by using the corrected relative distance Lc (the correction position LMa of the landmark LM) between the non-contact sensor 33 and the landmark LM and the registration position LMr of the landmark LM stored in the landmark registration position storage unit 13.

[Computer System]

Figure 9:
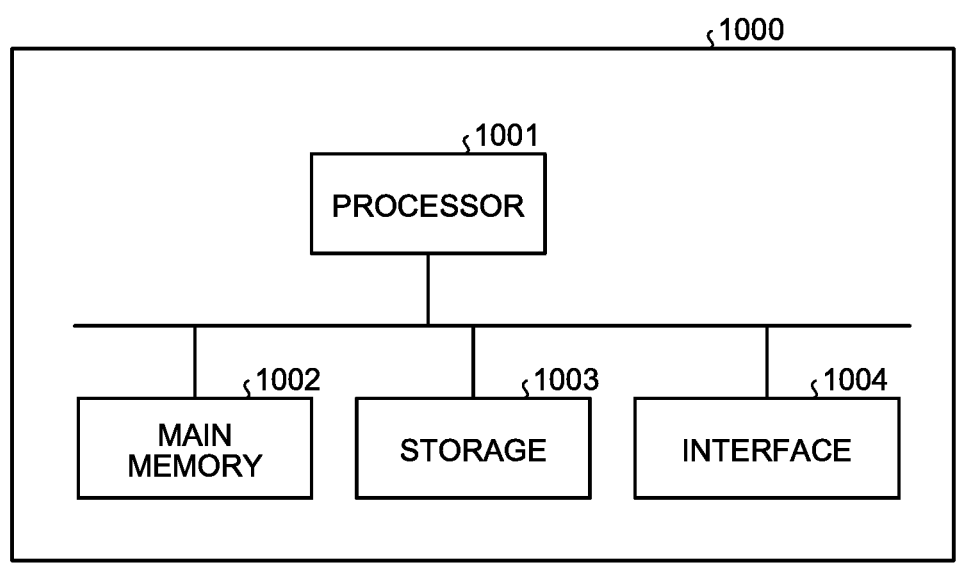
FIG. 9 is a block diagram illustrating an example of a computer system.

FIG. 9 is a block diagram illustrating an example of a computer system 1000. Each of the management device 3, the data processing device 10, and the traveling control device 40 described above includes the computer system 1000. The computer system 1000 includes a processor 1001 such as a central processing unit (CPU), a main memory 1002 including a nonvolatile memory such as a read only memory (ROM) and a volatile memory such as a random access memory (RAM), a storage 1003, and an interface 1004 including an input/output circuit. The function of the management device 3 described above, the function of the data processing device 10, and the function of the traveling control device 40 are stored in the storage 1003 as programs. The processor 1001 reads a program from the storage 1003, develops the program in the main memory 1002, and executes the above-described processing according to the program. Incidentally, the program may be distributed to the computer system 1000 via a network.

[Effect]

As described above, according to this embodiment, the correction value G is calculated while the work machine 2 is traveling (operating) in the GNSS traveling mode. Therefore, the correction value G can be calculated without stopping the traveling of the work machine 2. Since the non-contact sensor 33 is corrected (calibrated) in the traveling state of the work machine 2, it is possible to correct the non-contact sensor 33 while suppressing deterioration in productivity at the work site.

In a case where the GNSS traveling mode is changed to the landmark traveling mode, the first relative distance La calculated from the detection data of the non-contact sensor 33 is corrected on the basis of the correction value G, and the corrected relative distance Lc is calculated. Even in a case where the first relative distance La of the non-contact sensor 33 has an error, the first relative distance is corrected on the basis of the correction value G to calculate the corrected relative distance Lc having a small error from the true relative distance. When the corrected relative distance Lc is calculated, it is possible to appropriately correct the estimated position of the work machine 2 traveling by dead reckoning in the landmark traveling mode. Therefore, in the landmark traveling mode in which the work machine 2 travels while the position of the work machine 2 is measured using the landmark LM, it is possible to suppress the deterioration in the position accuracy of the work machine 2.

In this embodiment, the filter unit 19 performs the filter process of outputting detection data satisfying the defined condition from the detection data of the non-contact sensor 33 to the landmark detection position acquisition unit 12. As a result, the detection data based on the detection wave reflected by the landmark LM is output to the landmark detection position acquisition unit 12, and the transmission of the detection data based on the detection wave reflected by an object other than the landmark LM is suppressed.

Other Embodiments

Incidentally, in the above-described embodiment, the non-contact sensor 33 is provided at the front portion of the work machine 2 and detects an object ahead of the work machine 2 in the traveling direction. The non-contact sensor 33 may be provided at the side portion of the work machine 2 or at the rear portion of the work machine 2. The non-contact sensor 33 may detect an object behind the work machine 2 in the traveling direction.

Incidentally, in the above-described embodiment, at least a part of the function of the data processing device 10 may be provided in the management device 3, or at least a part of the function of the management device 3 may be provided in at least one of the data processing device 10 and the traveling control device 40. For example, in the above-described embodiment, the management device 3 may have the function of the landmark correction position calculation unit 18, and the corrected relative distance Lc calculated by the management device 3 may be transmitted to the traveling control device 40 of the work machine 2 through the communication system 4.

REFERENCE SIGNS LIST

1 MANAGEMENT SYSTEM
2 WORK MACHINE
3 MANAGEMENT DEVICE
3A TRAVELING CONDITION GENERATION UNIT
3B COMMUNICATION UNIT
4 COMMUNICATION SYSTEM
5 CONTROL FACILITY
6 WIRELESS COMMUNICATION DEVICE
7 LOADER
8 CRUSHER
9 CONTROL SYSTEM
10 DATA PROCESSING DEVICE
11 WORK MACHINE DETECTION POSITION ACQUISITION UNIT
12 LANDMARK DETECTION POSITION ACQUISITION UNIT
13 LANDMARK REGISTRATION POSITION STORAGE UNIT
14 FIRST RELATIVE DISTANCE CALCULATION UNIT
15 SECOND RELATIVE DISTANCE CALCULATION UNIT
16 CORRECTION VALUE CALCULATION UNIT
17 CORRECTION VALUE STORAGE UNIT
18 LANDMARK CORRECTION POSITION CALCULATION UNIT
19 FILTER UNIT
19A REFLECTION INTENSITY FILTER UNIT
19B ABSOLUTE SPEED FILTER UNIT
19C DETECTION POSITION FILTER UNIT
19D TRAVELING SPEED FILTER UNIT
19E POSTURE ANGLE FILTER UNIT
21 VEHICLE BODY
22 DUMP BODY
23 TRAVELING DEVICE
23A DRIVE DEVICE
23B BRAKE DEVICE
23C STEERING DEVICE
24 SPEED SENSOR
25 DIRECTION SENSOR
26 POSTURE SENSOR
27 WHEEL
27F FRONT WHEEL
27R REAR WHEEL
28 WIRELESS COMMUNICATION DEVICE
31 POSITION SENSOR
33 NON-CONTACT SENSOR
40 TRAVELING CONTROL DEVICE
AR1 DETECTION RANGE
CS TARGET TRAVELING COURSE
G CORRECTION VALUE
HL TRAVELING PATH
IS INTERSECTION
La FIRST RELATIVE DISTANCE
Lb SECOND RELATIVE DISTANCE
Lc CORRECTED RELATIVE DISTANCE
LM LANDMARK
LMa CORRECTION POSITION
LMr REGISTRATION POSITION
LMs DETECTION POSITION
PA WORK AREA
PA1 LOADING AREA
PA2 DUMPING AREA
PI POINT

The invention claimed is:

1. A work machine control system comprising:
a non-contact sensor which is provided on a work machine and detects a position of a landmark;
a landmark detection position acquisition unit which acquires a detection position of the landmark detected by the non-contact sensor in traveling of the work machine;
a landmark registration position storage unit which stores a registration position of the landmark;
a first relative distance calculation unit which calculates a first relative distance between the non-contact sensor and the landmark on a basis of the detection position of the landmark;
a second relative distance calculation unit which calculates a second relative distance between the non-contact sensor and the landmark on a basis of the registration position of the landmark;
a correction value calculation unit which calculates a correction value relating to a relative distance between the non-contact sensor and the landmark on a basis of the first relative distance and the second relative distance; and
a landmark correction position calculation unit which corrects the first relative distance on a basis of the correction value and calculates a corrected relative distance between the non-contact sensor and the landmark.

2. The work machine control system according to claim 1, comprising:
a position sensor which detects a position of the work machine traveling on a traveling path; and
a work machine detection position acquisition unit which acquires a detection position of the work machine detected by the position sensor in the traveling of the work machine, wherein
the second relative distance calculation unit calculates the second relative distance on a basis of the detection position of the work machine and the registration position of the landmark.

3. The work machine control system according to claim 1, comprising:
a traveling control device which controls a traveling state of the work machine on a basis of the corrected relative distance.

4. The work machine control system according to claim 3, wherein
the traveling control device corrects an estimated position of the work machine traveling by dead reckoning on the basis of the corrected relative distance.

5. The work machine control system according to claim 1, wherein
the non-contact sensor detects an object including the landmark ahead of the work machine in a traveling direction, the work machine control system comprising:
a filter unit which outputs detection data satisfying a defined condition from detection data of the non-contact sensor to the landmark detection position acquisition unit, the landmark detection position acquisition unit acquires the detection data satisfying the defined condition as the detection position of the landmark.

6. The work machine control system according to claim 5, wherein
the non-contact sensor detects a reflection intensity of the object in the traveling of the work machine, and
the defined condition includes that the reflection intensity is equal to or greater than a reflection intensity threshold.

7. The work machine control system according to claim 5, wherein
the non-contact sensor detects an absolute speed of the object in the traveling of the work machine, and
the defined condition includes that the absolute speed is less than an absolute speed threshold.

8. The work machine control system according to claim 5, wherein
the non-contact sensor detects a position of the object in the traveling of the work machine, and
the defined condition includes that a deviation between a detection position of the object and the registration position of the landmark is less than a deviation threshold.

9. The work machine control system according to claim 5, comprising:
a speed sensor which detects a traveling speed of the work machine in the traveling of the work machine, wherein
the non-contact sensor detects the object in the traveling of the work machine, and
the defined condition includes that the traveling speed of the work machine is less than a traveling speed threshold.

10. The work machine control system according to claim 5, comprising:
a posture sensor which detects a posture angle of the work machine in the traveling of the work machine, wherein
the non-contact sensor detects the object in the traveling of the work machine, and
the defined condition includes that the posture angle is less than an angle threshold.

11. A work machine comprising: the work machine control system according to claim 1.

12. A work machine control method comprising:
acquiring a detection position of a landmark detected by a non-contact sensor provided in a work machine in traveling of the work machine traveling on a traveling path;
calculating a first relative distance between the non-contact sensor and the landmark on a basis of the detection position of the landmark;
calculating a second relative distance between the non-contact sensor and the landmark on a basis of a registration position of the landmark;
calculating a correction value relating to a relative distance between the non-contact sensor and the landmark on a basis of the first relative distance and the second relative distance;
correcting the first relative distance on a basis of the correction value to calculate a corrected relative distance between the non-contact sensor and the landmark; and
controlling a traveling state of the work machine on a basis of the corrected relative distance.

* * * * *